United States Patent [19]

Adell

[11] Patent Number: 5,280,269
[45] Date of Patent: Jan. 18, 1994

[54] INTERIOR HIGH BEAM HEADLIGHT WARNING SYSTEM

[76] Inventor: Robert Adell, 31800 S. Brandingham, Franklin, Mich. 48025

[21] Appl. No.: 999,600

[22] Filed: Dec. 31, 1992

[51] Int. Cl.⁵ .......................... B60Q 11/00; B60Q 1/00
[52] U.S. Cl. .................................... 340/458; 340/457; 340/457.2; 315/82
[58] Field of Search .................... 340/458, 457, 457.2, 340/461, 462; 315/82, 83

[56] References Cited

U.S. PATENT DOCUMENTS 4,835,512 5/1989 Bratton ............................. 340/457.2

FOREIGN PATENT DOCUMENTS 0176135 10/1984 Japan ................................ 340/457.2

Primary Examiner—Donnie L. Crosland
Attorney, Agent, or Firm—Alex Rhodes

[57] ABSTRACT

A motor vehicle' high beam indicator comprising a flashing light and/or audible signal generator to inform a driver that his headlight high beams are turned on. The flashing light and audible signal ar automatically activated when the high beams are turned on and automatically deactivated when the headlights are switched to the low beam operating mode or turned off. The flashing light may also be switched to a non-flashing operating mode and the audible signal deactivated separately with a driver control. If the headlights are turned off in the high beam operating mode, the high beam indicator system automatically resets itself irrespective of whether the indicator system has been deactivated with the driver control.

10 Claims, 2 Drawing Sheets

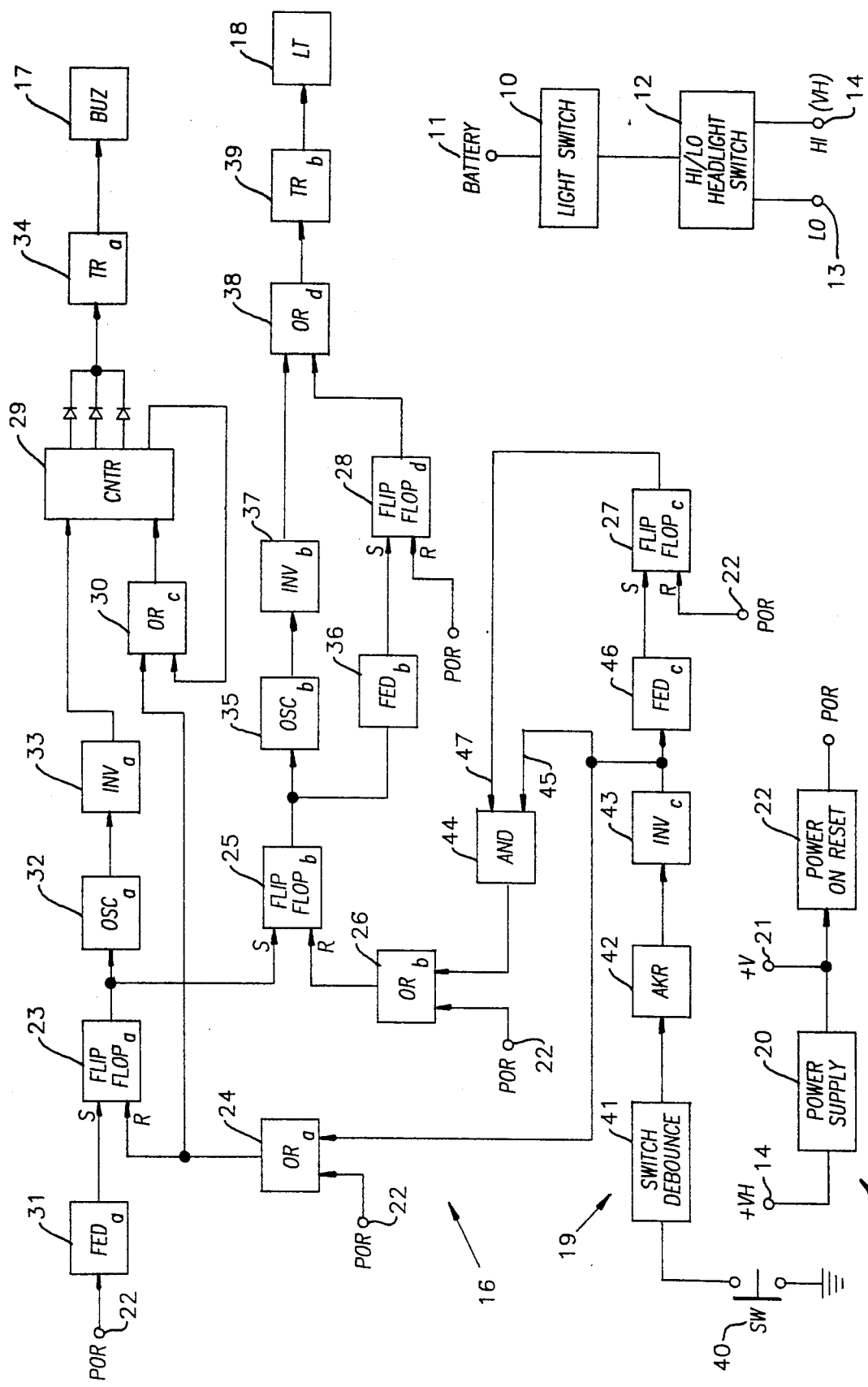

INTERIOR HIGH BEAM HEADLIGHT WARNING SYSTEM

BACKGROUND OF THE INVENTION

This invention relates to automobile controls and more particularly to a system for informing a driver that his high beam headlights are turned on.

The current practice is to provide a steady low intensity blue light on the instrument panel for notifying the driver that his high beams are turned on. For many drivers, the blue light is not effective, and high beams are inadvertently left on, subjecting other drivers to considerable annoyance and in some cases impairing their driving ability.

One solution to the bright headlight problem is to signal oncoming drivers and drivers behind a vehicle to transmit a signal to request them to dim their vehicle's bright headlights. Systems for warning other drivers to dim their bright headlights are covered in Robert Adell U.S. Pat. Nos. 5,113,175 and 5,119,067.

SUMMARY OF THE INVENTION

The present invention provides an effective means for reminding drivers that their vehicle's high beam headlights are on.

One benefit of the present invention is that it can be readily incorporated into new vehicle programs. Another benefit is that current vehicles can be easily retrofitted with the present invention.

It is a primary object of the invention to provide an automobile with an effective means for attracting a driver's attention to the operating state of his vehicle's high beam headlights.

It is still another object of the present invention to provide a high beam indicator system which can be partially deactivated with a driver control and automatically resets itself when the headlights are turned off irrespective of whether the system has been deactivated by the driver control.

With the foregoing objects in mind and other objects in view, the present invention comprises a signal light mounted in a vehicle instrument panel, an audible signal generator, a driver switch and an electronic control for operating the signal light and audible signal generator.

The electronic control comprises a power supply, a reset circuit, an acoustic channel, an optical channel and a control circuit. When the high beams are turned on, the signal light automatically begins to flash and the audible signal is automatically activated. The flashing light and audible signal are automatically deactivated when the headlights are switched to the low beam operating mode or turned off. The flashing light may also be switched to a non-flashing operating mode and the audible signal deactivated separately with the driver control. If the headlights are turned off in the high beam operating mode, the high beam indicator system automatically resets itself irrespective of whether the indicator system has been deactivated with the driver control.

Further benefits, features and objects of the invention will be apparent from the ensuing description of the invention and accompanying drawings which describe the invention in detail. A preferred embodiment is disclosed in accordance with the best mode which is contemplated in practicing the invention, and the subject matter in which exclusive property rights are claimed is set forth in each of the numbered claims at the conclusion of the detailed description.

BRIEF DESCRIPTION OF THE DRAWINGS

FIG. 2 is a schematic diagram of the electronic control portion of the system of FIG. 1.

FIG. 3 is a schematic diagram of the high/low beam switching portion of the system of FIG. 1.

DETAILED DESCRIPTION OF THE PREFERRED EMBODIMENT

Figure 1:
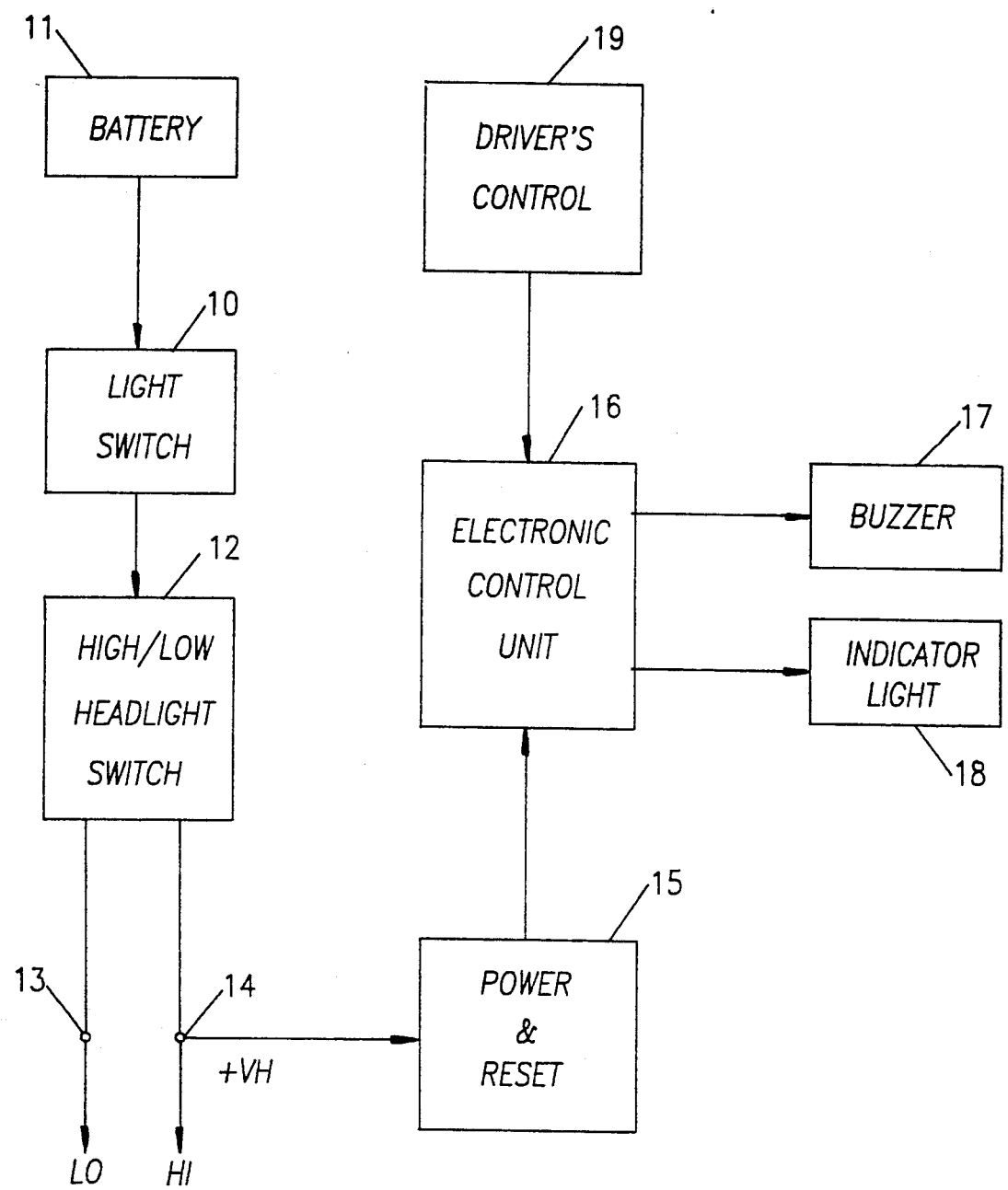
FIG. 1 is a block diagram of a headlight high beam indicator system according to the present invention.

Referring now to the drawings wherein like numerals designate like and corresponding parts throughout the several views, a vehicle headlight high beam indicator system is shown in schematic form for purposes of illustrating the invention. The high beam indicator system, which is generally shown in FIG. 1, is comprised of a driver's control 19, a electronic control unit 16, buzzer 17, indicator light 18 and a power and reset circuit 15. A vehicle light switch 10 turns the vehicle's exterior lights on and off.

Referring now to FIG. 3, switch receives current from a battery 11 and is in series with high/low beam headlight switch 12 which establishes the operating modes of the headlights. When the light switch 10 is closed, the headlights are in the high beam mode if the high/low beam switch 12 is at the high beam position. The low and high beam outputs of the switch 12 are labeled 13 and 14 correspondingly. The switch outputs are connected to their respective headlight circuits (not shown).

The high beam output +VH 14 supplies power to a power and reset circuit 15. The power and reset circuit 15 activates and resets an electronic control unit 16 which controls an audible signal generator, preferably a buzzer 17 and/or an indicator light 18 either of which are intended to remind a driver that his headlights are in a high beam operating condition. The driver's control 19 enables the driver to change the system mode of operation.

The high beam indicator system generally operates as follows. When headlight switch 12 is in a high beam position a voltage at output 14 is supplied to the power and reset circuit 15 which activates the electronic control unit 16. The indicator light 18 which reminds the driver that the high beams are on begins flashing. At the same time the buzzer 17 begins to operate sending an audible signal to the driver. When the driver of the vehicle switches headlight switch 12 from the high beam to the low beam position, the light 18 and buzzer 17 are deactivated.

If the driver does not want the buzzer 17 to operate, he depresses and releases a spring biased switch 40, shown in FIG. 2, causing the buzzer to cease to operate. If the driver depresses and releases switch 40 a second time, the indicator light 18 goes from a flashing light to a constant light and remains in this condition until the high beams are turned off. If the driver goes from high beam to low beam and back to high beam, the power and reset circuit 15 resets and reactivates the electronic control 16 whereby the buzzer 17 and the indicator light 18 are again automatically activated.

Referring now to FIG. 2, the power and reset circuit 15 is comprised of a power supply 20 with a +V output terminal 21 for supplying power to the high beam indicator system, and a reset circuit (POR for Power On Reset) 22. The POR 22 resets the flip-flops FFa 23 (through ORa gate 24), FFb 25 (through ORb gate 26), FFc 27, and FFd 28 of the driver's control 19 and electronic control unit 16 to off positions. A counter (CNTR) 29 is also reset from the POR 22—through ORa and ORc gates 24 and 30, respectively. Thus, the power and reset circuit 15 is responsive to high beam o state and supplies both power (+V 21) and POR 22 only when high/low headlight switch 12 is in high beam position 14.

There are two signaling channels, namely, an acoustic and an optical signaling channel. The buzzer 17 and the indicator lamp 18 are connected to the output of the respective channels. The POR 22 activates a falling edge detector (FED) "a" 31 which together with FFa 23 and ORa 24 combine the above mentioned channels, these being the common elements of both channels.

The falling edge detector will only operate and produce a pulse on the falling edge of the input signal. When the power supply 20 is turned on, the POR 22 goes high and stays high for approximately one half second. Then POR 22 returns back to the low position. When POR 22 returns to the low position, the output of the falling edge detector 31 goes high and remains high for a short time and then goes low. The function of the FEDa 31 is to delay the on state of the FFa 23 to allow the POR 22 to reset all the flip-flops prior to the setting of FFa 23.

Included in an acoustic signalling channel are an oscillator (OSC) "a" 32, an inverter (INV) "a" 33, the ORc gate 30, the CNTR 29, a transistor (TR) "a" 34, and the buzzer (BUZ) 17. The OSCa 32 is a source of a signal which causes the buzzer 17 to buzz. If there is no input signal, the output of the OSCa 32 is high. Because of this, it is necessary to have the INVa 33 to keep the input of the transistor "a" 34 low. The INVa 33 supplies the input signal of the transistor TRa 34 which operates the buzzer 17. INVa 33 and TRa 34 can be connected directly or through the counter 29 having the ORc gate 30 inserted into a reset loop thereof.

The optical signalling channel is comprised of FFb 25, OSCb 35 and FEDb 36, INVb 37 and FFd 28, ORd gate 38, TRb 39 and indicator light 18. FFb 25 is set from the high output of FFa 23, and its output is connected in parallel with OSCb 35 and FEDb 36. OSCb 35 has an INVb 37 at its output for the same reason as previously described for OSCa 32 and INVa 33. The output of the FEDb 36 is tied with the set input of FFd 28. Through an ORd gate 38 which unites their outputs, INVb 37 and FFd 28 control TRb 39 which operates the light 18.

The driver's control circuit, depicted in FIG. 2 regulates the mode of operation of the acoustic signalling channel and the optical signalling channel. The control circuit 19 comprises a spring loaded normally off switch 40 located in the driver's area, a switch debounce unit 41, an automatic keyboard repeat unit (AKR) 42 and an INVc 43, all connected in series. Included also in the control circuit are an AND gate 44 with its first input 45 connected to the INVc 43 output, a FEDc 46 fed from the INVc 43 output, and FFc 27. FFc 27 is set by the FEDc 46 and provides an output to the second input 47 of the AND gate 44.

The AKR 42 is the type of circuitry commonly found in the computer keyboards. Depressing any computer keyboard key provides one output pulse and holding the key down results in a train of output pulses. The circuitry for this particular item is such that with no input to the AKR 42 its output is high. For this reason, the inverter (INVc 43) is connected to the AKR output.

The pulses from the INVc 43 output are fed to three different areas, two of which have been previously discussed, i.e., to AND gate 44 through its input 45, and to the falling edge detector "c" 46. They are also fed through the ORa gate 24 to the reset input of the flip-flop "a" 23 and through the ORa and ORc gates 24, 30 to the reset input of the CNTR 29. Through ORb gate 26, a signal from the AND gate 44 resets the FFb 25.

The circuits of FIG. 2 operate as follows. When power is applied to the high beams, i.e. when the high/low headlight switch 12 is in its high beam position 14, POR 22 goes high resetting FFa 23, FFb 25, FFc 27 and FFd 28. POR 22 then goes low, and the output of FEDa 31 goes from low to high and back to low. After the FEDa 31 goes high, the FFa 23 output goes high. When the output of FFa 23 goes high, OSCa 32 is turned on, and through the INVa 33 and CNTR 29 the signal is supplied to TRa 34 and the buzzer 17 is activated. The purpose of counter 29 is to produce an intermittent sounding of buzzer 17. The outputs of the CNTR 29 can be united in different combinations to provide the desirable signal/pause ratio of the buzzer 17 output.

Also, the output of the FFa 23 sets FFb 25 turning on the OSCb 35 which acts through the ORd gate 38 to run the TRb 39 and flash the light 18.

When the output of the FFb 25 goes high, the output of the falling edge detector "b" 36 will not be high because the output of the flip-flop "b" 25 remains high so the FFd 28 is disabled at this time.

The condition of the circuit is such that the buzzer 17 buzzes intermittently, and the light 18 flashes continuously.

When the driver of the automobile wishes to turn off the buzzer 17, he depresses and releases the spring biased switch 40 one time. This causes the output of switch debounce unit 41 to go high. When the output of unit 41 goes high, the output from the AKR 42 goes low, and the output of INVc 43 goes high.

The portion of the signal from the INVc 43 output which is fed through the ORa gate 24 resets FFa 23. It turns off FFa 23, and the oscillator OSCa 32, the counter CNTR 29, the transistor TRa 34, and the buzzer 17.

After the high output of flip-flop "a" 2 has been eliminated, the set line on flip-flop "b" 25 is low, however the output of the FFb 25 remains high. As long as the output of the inverter "c" 43 is high, the output of FEDc 46 is low, but the input 45 to the AND gate 44 is high. Thus, the AND gate 44 will be low because the flip-flop "c" 27 has not been set a yet and its output is low. When the pulse from the INVc 43 goes to the low state, the input 45 to the AND gate 44 becomes low and FEDc 46 pulses the set line on the FFc 27. At this time the output on the FFc 27 goes high putting the high into the second input 47 of the AND gate 44. But by that time, the first input 45 to the AND gate 44 is already low, therefore, the output from the AND gate 44 will still be low.

At this time the status of the channels is as follows: the buzzer 17 has ceased operation and the light 18 is still flashing.

If the operator decides to change the mode of operation of the flashing light and have it go to the constant shining, he pushes the switch 40 again. When he does this, the signal from the switch debounce unit 41, through AKR 42 and INVc 43 goes high. At this time AND gate 44 has one input 47 already high, that is the output from FFc 27, and when the output from INVc 43 goes high, AND gate 44 will conduct, its output goes high, the output of ORb gate 26 goes high and this resets the flip-flop "b" 25.

When FFb 25 is reset, FEDb 36 produces an output pulse which sets the flip-flop "d" 28. When FFd 28 goes high, ORd gate 38 has a constant output, and the light 18 shines constantly.

Hence, the situation of the logic is that the buzzer 17 operation has been terminated, the operation of the flashing light has been terminated, and the light 18 is shining constantly.

The system remains in this format until such time as the headlights are switched from high beam to low beam. When this occurs, the system goes back in operation the next time the headlights are switched back into the high beam position.

When the operator holds his hand on the switch 40 for a period of approximately two seconds, that is if the switch 40 is held closed long enough, it produces one output signal from the inverter "c" 43, and then there will be another output signal.

Summarizing the operation of the system from the driver's stand point, if the driver wishes to terminate the buzzer, he depresses the switch 40 once. If after that he wants to change the mode of operation of the indicator light 18, he depresses the switch 40 again and that would terminate the operation of the blinking light. The indicator light 18 would nevertheless shine constantly.

Since the driver is capable of holding the switch 40 past resetting the acoustic signalling channel and changing the mode of the optical signalling channel, it can be seen that continually putting pulses out from AKR 42 will have no further effect on the status of the system. It is so because AKR 42 has the responsibility of resetting the flip-flops "a" 23 and "b" 25. Once the flip-flops have been reset, putting additional pulses into the two reset lines of the flip-flop "a" 23 and the flip-flop "b" 25 will add no further effect on the logic of the system, and the buzzer 17 and the flashing indicator light 18 will both be kept terminated. Also this has no effect on the fact that the indicator light 18 will be shining constantly because the reset line of the flip-flop "d" 28 which is responsible for keeping the light 18 constantly shining does not go to the AKR 42 output.

There is a wide variety of the components available at the market that may be exploited in implementing the system of the present invention. Specifically, for an actual system that has been built, tested and found to comply with everything described above, the following RCA CMOS integrated circuits have been used:

—CD4001B quad 2-input NOR gates —for all the flip-flops and the inverters "a" and "b";
—CD4001B quad 2-input NAND gate—for one half of the AND gate 44, for the switch debounce unit 41 and for the INVc 43;
—CD4017B decade counter—for the CNTR 29;
—CD4071B quad 2-input OR gates—for all the OR gates; and
—CD4093B quad 2-input NAND Schmitt triggers—for the falling edge detectors 31, 36 and 46, for the oscillators 32 and 35, for the AKR 42 and POR 22, and for the second half of the AND gate 44.

While this invention has been described in conjunction with a specific embodiment, it should be apparent for those skilled in the art that different alternatives, modifications and variations are possible in implementing the particular blocks forming the system according to the invention by mere substitutions and/or changes of ICs and other components. Accordingly, it is intended to embrace all such alternatives, modifications and variations as may fall within the spirit and broad scope of the claims which follow hereinafter.

I claim:

1. In a vehicle having a pair of headlights which are selectively operable for projecting a pair of high beams and for projecting a pair of low beams, a vehicle headlight high beam indicator system for reminding a driver of said vehicle that his headlight's high beams are turned on comprising: a high beam indicator light mounted in the interior of a vehicle in clear view of the driver, said indicator light having two operating modes, a first operating mode wherein said light is flashing on and off, and a second operating mode wherein said light is constantly illuminated; a audible signal generator mounted in the interior of said vehicle for producing an intermittent audible signal; an electronic control unit for activating and controlling said indicator light and said audible signal generator, said electronic control unit simultaneously activating said indicator light in said first flashing operating mode and said audible signal generator when said vehicle's headlight high beams are turned on and deactivating said indicator light and said audible signal generator when said vehicle's high beams are turned off; a driver's control for selectively first deactivating said audible signal generator and for next switching said indicator light to said second constant illumination mode when said vehicle's headlight high beams are turned on; and a power and reset circuit for activating and resetting said electronic control unit and said driver's control when said vehicle's headlight high beams are turned on regardless of whether said driver's control has been previously operated.

2. The vehicle headlight high beam indicator system recited in claim 1 wherein said audible signal generator is a buzzer.

3. In a vehicle having a pair of headlights which are selectively operable for projecting a pair of high beams and for projecting a pair of low beams, a vehicle headlight high beam indicator system for reminding a driver of said vehicle that his headlight's high beams are turned on comprising: a high beam indicator light mounted in the interior of a vehicle in clear view of the driver, said indicator light having two operating modes, a first operating mode wherein said light is flashing on and off, and a second operating mode wherein said light is constantly illuminated; an electronic control unit for activating and controlling said indicator light, said electronic control unit activating said indicator light in said first flashing operating mode when said vehicle's headlight high beams are turned on and deactivating said indicator light when said vehicle's high beams are turned off; a driver's control for switching said indicator light to said second constant illumination mode when said vehicle's headlight high beams are turned on; and a power and reset circuit for activating and resetting said electronic control unit and said driver's control when said vehicle's headlight high beams are turned on regardless of whether said driver's control has been previously operated.

4. In a vehicle having a pair of headlights which are selectively operable for projecting a pair of high beams and for projecting a pair of low beams, a headlight high beam indicator system for reminding a driver of a vehicle that his headlight's high beams are turned on, said indicator system having a first operating state, said first operating state being automatically activated when said headlight's high beams are turned on; a second manual operating state which can be activated by said vehicle's driver after said first state, and a means for resetting said first operating state each time said vehicle's headlights are turned on regardless of whether said second operating state has been previously activated by said driver.

5. The headlight high beam indicator system recited in claim 4 further comprising an audible signal generator for reminding said driver that his vehicle's headlight high beams are turned on, said audible signal generator being automatically activated in said first operating state.

6. The headlight high beam indicator system recited in claim 5 wherein said audible signal generator can be deactivated by said driver in said second operating state.

7. The headlight high beam indicator system recited in claim 4 further comprising a flashing indicator light, said flashing indicator light being automatically activated in said first operating state.

8. The headlight high beam indicator system recited in claim 4 further comprising an audible signal generator and a flashing indicator light for reminding said driver that his vehicle's headlight high beams are turned on, said audible signal generator and said flashing indicator light being automatically activated and controlled in said first operating state.

9. The headlight high beam indicator system recited in claim 4 further comprising an indicator light, said indicator light having two operating modes, a first operating mode wherein said light flashes on and off being in said first operating state, and a second operating mode wherein said light is constantly illuminated being in said second operating state.

10. The headlight high beam indicator system recited in claim 8 further comprising an electronic control unit for activating and controlling said indicator light and said audible signal generator, said electronic control unit simultaneously activating said indicator light and said audible signal generator in said first operating mode when said vehicle's headlight high beams are turned on and deactivating said indicator light and said audible signal generator when said vehicle's high beams are turned off.

* * * * *

UNITED STATES PATENT AND TRADEMARK OFFICE
CERTIFICATE OF CORRECTION

PATENT NO.   :   5,280,269
DATED        :   January 18, 1994
INVENTOR(S)  :   Robert Adell It is certified that error appears in the above-identified patent and that said Letters Patent is hereby corrected as shown below:

In the Abstract, line 4, change "ar" to --are--

Column 2, line 24, after "switch" insert --10--

Column 3, line 7, change "o" to --on--

Column 4, line 46, change "2" to --23--

Column 6, line 18, change "a" to --an--

Signed and Sealed this

Third Day of May, 1994

Attest:

BRUCE LEHMAN

Attesting Officer        Commissioner of Patents and Trademarks